United States Patent [19]
Thomas

[11] 3,887,217
[45] June 3, 1975

[54] RETRACTABLE STEP FOR VEHICLES

[76] Inventor: Walter W. Thomas, Rt. 1, Box 130B, Clatskanie, Oreg. 97016

[22] Filed: Dec. 3, 1973

[21] Appl. No.: 421,082

Related U.S. Application Data

[63] Continuation-in-part of Ser. No. 196,836, June 23, 1972.

[52] U.S. Cl. .............. 280/166; 105/444; 105/447
[51] Int. Cl. .............................................. B60r 3/02
[58] Field of Search ........... 280/166; 105/444, 447, 105/449; 244/137 P; 182/89

[56] References Cited
UNITED STATES PATENTS

| | | | |
|---|---|---|---|
| 1,122,063 | 12/1914 | Blake | 105/444 |
| 2,118,557 | 5/1938 | Hamilton | 280/166 |
| 2,682,671 | 7/1954 | Faure | 280/166 X |
| 2,797,104 | 6/1957 | Drobney | 280/166 |
| 3,627,350 | 12/1971 | Cross | 280/166 |
| 3,771,815 | 11/1973 | Bridges | 280/166 |

*Primary Examiner*—David Schonberg
*Assistant Examiner*—Michael J. Forman
*Attorney, Agent, or Firm*—Eugene M. Eckelman

[57] ABSTRACT

A base plate is arranged to be clamped to the vehicle frame and has two side support arms and an intermediate support arm from which a step supporting frame is pivotally suspended. A reversible motor is mounted on the intermediate arm and drives a gear lever having a link connection with the step supporting frame such that when rotated to one limit position the step withdraws to an upper inner position and when rotated in the opposite direction to its other limit position the step is extended in a downward location.

1 Claim, 3 Drawing Figures

PATENTED JUN 3 1975　　3,887,217

RETRACTABLE STEP FOR VEHICLES

REFERENCE TO PRIOR APPLICATIONS

This application is a continuation in part of application Ser. No. 196,836, filed June 23, 1973 for Electro Step now abandoned.

Most small trucks and some vehicles such as four wheel drive vehicles, campers, trailers, and the like are very difficult to enter into or descend from since the doorstep is at least twenty inches above the ground. Devices have heretofore been proposed which provide steps for vehicles, such as shown in U.S. Pat. No. 1,122,063 and U.S. Pat. No. 2,682,671. Such devices, however, are complex in construction and do not provide the sturdiness and simplicity required for a step of the type desired. It must be remembered that such steps, in addition to being sturdy, must be rugged in construction since they are disposed under the vehicle and will get covered with mud and road grime.

SUMMARY OF THE INVENTION

According to the present invention and forming a primary objective thereof a retractable step for vehicles is provided which is simplified in construction and yet is rugged in use both in its operation as a step and in its function in its mounted position under a vehicle.

A more particular object of the invention is to provide a retractable step of the type described which has a base plate providing a secure mounting on the vehicle frame and employing support arms on which the step has pivotal extending and retracting movement by means of a reversible drive motor connected to the step by a toothed lever.

Another object is to provide a retractable step of the type described wherein the drive motor comprises an electric motor and the circuit therefor includes a pair of limit switches for limiting both the retracting and extending movements of the step.

The invention will be better understood and additional objects and advantages will become apparent from the following description taken in connection with the accompanying drawings.

DETAILED DESCRIPTION OF A PREFERRED EMBODIMENT

Figure 1:
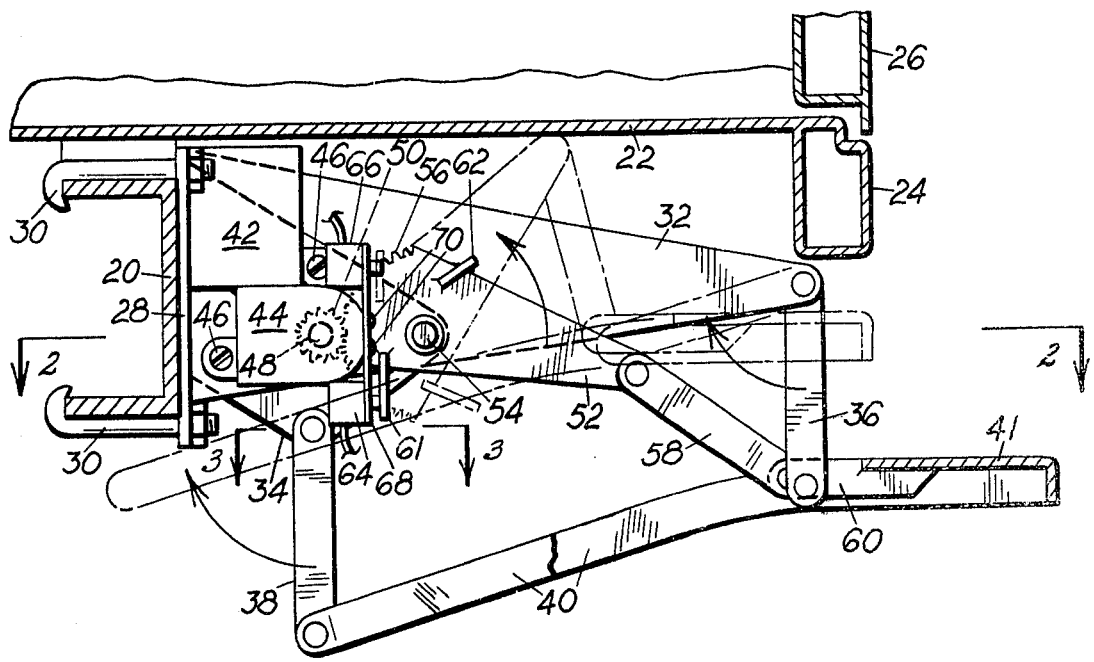
FIG. 1 is a vertical sectional view of the step of the present invention taken on the line 1—1 of FIG. 2, the full lines thereof showing the step in a lowered extended position and the phantom lines showing the step in a raised retracted position.
Figure 3:
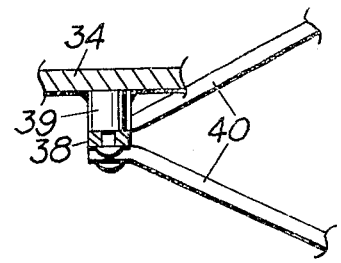
FIG. 3 is a fragmentary sectional view taken on the line 3—3 of FIG. 1.
Figure 2:
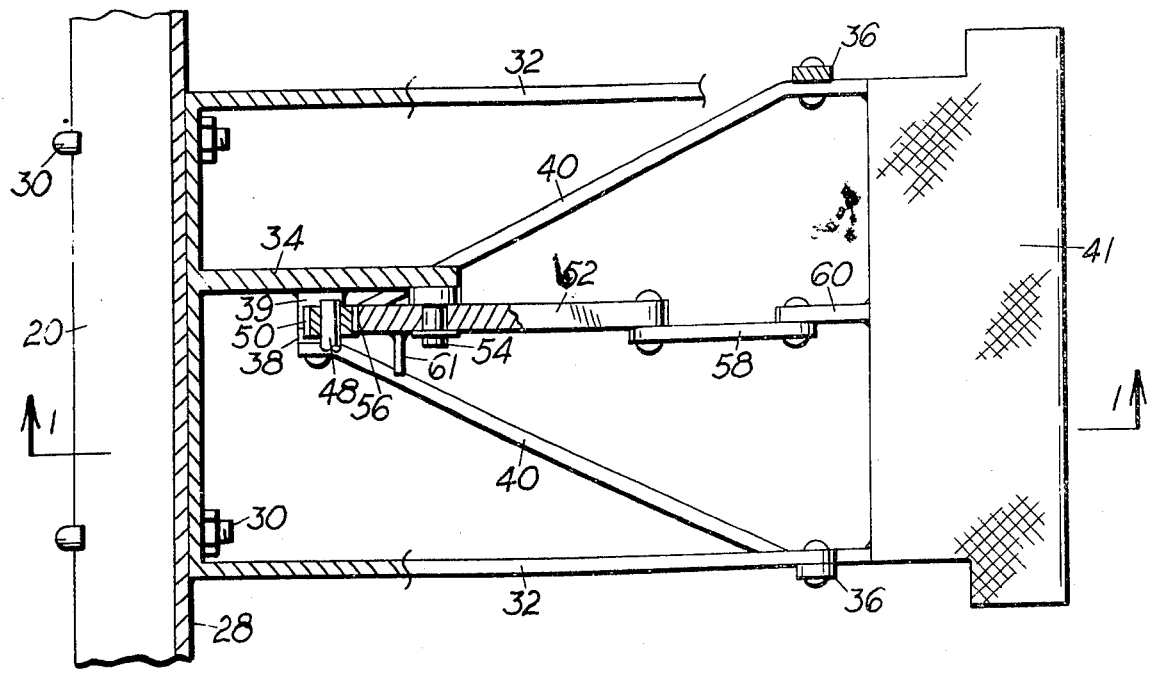
FIG. 2 is a sectional view taken on the line 2—2 of FIG. 9, this view being partly broken away.

With particular reference to FIGS. 1, 2 and 3, the numeral 20 represents a longitudinally extending vehicle frame member, the numeral 22 represents the floor of the vehicle, the numeral 24 represents an outer frame member generally substantially flush with the outside surface of the vehicle, and the numeral 26 represents the vehicle door. The present device is mounted on the frame 20 in the area of the door 26 to assist persons in getting into and out of the vehicle.

The device includes a base plate 28, and this base plate is secured flush against the side of the frame member 20 by hook bolts 30. The use of bolts 30 permits the base to be installed on the vehicle without drilling or other custom fitting.

Projecting integrally from the base plate 28 in parallel relation with each other are two side support arms 32 and an intermediate support arm 34 offset from the center between the side arms but parallel therewith. A pair of links 36 are pivotally supported on the outer ends of the respective arms 32, and a single link 38 is pivotally supported at the end of a spacer block 39, FIG. 2, secured on 34. Links 36 have pivotal connection to respective divergent side frames 40 which support a step plate 41 at their outer ends. The bottom end of link 38 has pivotal connection to the inner ends of frames 40. The links 36 and 38 support the step frames 40 in an arrangement such that when rotated clockwise, as viewed in FIG. 1, the step will be simultaneously retracted and raised and when rotated in the opposite direction, the step will be extended and lowered, as will be more fully described hereinafter. Spacer block 39 allows for centering of the pivot link 38 between the arms 32 and for upper movement of the frames 40 relative to arm 34.

A reversible electric motor 42 and a driven reduction gear box 44 thereon are secured to the arm 34, as by screws 46, and the gear box 44 has an output shaft 48 on which a pinion gear 50 is secured. A lever 52 has a pivot support 54 on the arm 34, and this lever has a toothed or gear end 56 in mesh with the pinion gear 50. The end of the lever 52 opposite from the toothed end has a pivot connection with one end of a link 58 pivotally connected at its other end to an ear 60 on the inner side of the step 42. The step is driven to its retracted and extended positions by the lever 52 under driving power from the motor 42, and the lever has a pair of laterally projecting tabs 61 and 62 integral therewith associated respectively with limit switches 64 and 66 secured on a mounting plate 68 attached to the gear box 44, as by screws 70. These limit switches are in the circuit to the motor 42, and the respective tabs 61 and 62 are arranged such that they stop the motor at the two limit positions of the step. The wiring arrangement for the motor and limit switches is not shown since such is accomplished in a manner well known in the art.

The retractable step is readily mounted on the frame 20 by means of the bolts 30 in a position under the door 26. In the retracted position of the step, as shown in phantom lines in FIG. 1, the motor 42 will have rotated in a direction to drive the lever 52 counterclockwise. This pulls the step inwardly, and the links 36 and 38 cause it to simultaneously raise. In such raised position, the step and its operating parts are all above the bottom of the frame 20 and are thus not in the way of operation of the vehicle. The step and its operating parts are also protected in such raised position. To lower the step, the motor 42 is operated in the reverse direction wherein the arm 52 and the linkage will move the step down and out to the use position as shown in full lines in FIG. 1. The circuit to the motor has suitable operating switches of conventional construction and arrangement whereby the motor can be operated from any remote position desired such as in the cab of the vehicle. The step is stopped automatically at its raised and lowered positions by the limit switches to avoid an overload on the motor.

The structure provided in the present step is simplified and rugged in construction and is substantially free from fouling by mud rocks etc., It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A retractable step for high clearance vehicles of the type having a longitudinally extending frame member, comprising
   a. a vertical base plate,
   b. releasable clamp means on said base plate arranged to secure said base plate vertically against the side of the frame member of the vehicle,
   c. a pair of support arms extending integrally from said base plate at right angles thereto whereby to be disposed laterally of the vehicle,
   d. a third support arm extending integrally from said base plate at right angles thereto and between said pair of support arms,
   e. a step plate,
   f. a pair of side frames extending integrally from said step plate toward said base plate,
   g. said side frames extending angularly inwardly toward each other from said step plate,
   h. a pair of depending links pivotally connected between respective ones of said support arms and said side frames,
   i. a third depending link pivotally connected between said third support arm and an inward end of said side frames,
   j. said pair of depending links and said third depending link being arranged upon pivoted movement in one direction to raise and retract said side frames and upon pivoted movement in the other direction to lower and extend said side frames,
   k. a lever arm pivotally mounted intermediate its ends on said third support arm in parallel relation to the latter,
   l. a gear segment on one end of said arm,
   m. pivot link means connecting the other end of said lever arm to said step plate,
   n. and reversible electric motor means mounted on said base plate having an output shaft with a pinion gear thereon in meshing engagement with said lever arm gear segment for rotating the latter to move said side frames between their raised and lowered positions.

* * * * *